March 7, 1967   M. L. FEIN ETAL   3,307,815
APPARATUS FOR DETERMINATION OF
SHRINK-TEMPERATURE OF LEATHER
Filed May 11, 1965   2 Sheets-Sheet 1

M.L. FEIN
E.H. HARRIS, JR.
R.R. CALHOUN, JR.
INVENTORS

BY R. Hoffman
ATTORNEY

March 7, 1967

M. L. FEIN ETAL

APPARATUS FOR DETERMINATION OF
SHRINK-TEMPERATURE OF LEATHER 3,307,815

Filed May 11, 1965

M. L. FEIN
E. H. HARRIS, JR.
R. R. CALHOUN, JR.
INVENTORS

BY *R. Hoffman*

ATTORNEY

United States Patent Office 3,307,815
Patented Mar. 7, 1967

3,307,815
APPARATUS FOR DETERMINATION OF SHRINK-TEMPERATURE OF LEATHER
Martin L. Fein, Philadelphia, Edward H. Harris, Jr., Ambler, and Robert R. Calhoun, Jr., Philadelphia, Pa., assignors to the United States of America as represented by the Secretary of Agriculture
Filed May 11, 1965, Ser. No. 455,021
3 Claims. (Cl. 248—316)

A non-exclusive, irrevocable, royalty-free license in the invention herein described, throughout the world for all purposes of the United States Government, with the power to grant sublicenses for such purposes, is hereby granted to the Government of the United States of America.

This invention relates to apparatus for determining shrink-temperature of leather.

The shrink-temperature (Ts) of leather is one of the measurements of the tanning process, a measure of the hydrothermal stability of the leather. This is an important physical property of great interest to practical tanners as well as to the scientists in the leather laboratories working on research and development in this field.

The simplest way of determining the temperature at which a leather specimen starts to shrink is to tie or clip one end of a specimen to a thermometer that is then immersed in a beaker of water heated at a given rate and stirred enough to avoid temperature stratification. In as much as the lower end of the specimen is free, an obvious difficulty is to keep the specimen in place so that a small change in specimen length can be detected.

Most of the early devices, as well as those in present-day use, eliminated the free-end determination by their design. These devices operate on the principle whereby tension is applied to the specimen. The specimen is fixed by a clamp at one end with the other end attached to a counter balance over a pulley. When the specimen shrinks the movement of the counter balance or the movement of the pulley is read on a scale. The temperature at which there is definite movement, due to increase in tension, is recorded as the shrink temperature. The Theis Leather Shrinkage Tester, commercially available, is a well known example of such apparatus wherein the shrinkage movement under tension is magnified 30 to 1.

The application of tension to the specimen automatically introduces a variable error which depends on the type of specimen and factors concerned with the design of the apparatus. As an example, Method 7011 of Federal Specification KK–L–311a states in part "weight—shall not cause an elongation (prior to shrinkage) of more than 10 percent." Thus, the free-end method of determining shrink-temperatures is preferred, especially if the difficulty of keeping the specimen in place is removed.

An object of the present invention is to provide an apparatus which facilitates detection of shrinkage of a strip of leather.

Another object is to provide an apparatus which enables determination of the shrink temperature of a specimen of leather with one end free.

A further object is to provide an apparatus which supports the specimen in a manner that markedly improves the accuracy of observations made in determining the shrink temperature.

Other objects and a fuller understanding of the invention will be apparent from inspection of the specification and claims, in combination with the drawings in which, FIG. 1 is a side elevation of a preferred embodiment of the specimen holder with a specimen in place;

The invention comprises a device for clamping the specimen at one end and supporting the specimen so that substantially only longitudinal movement is possible.

In general the device comprises an elongated handle to which is secured, in any suitable manner, a channel-like member adapted to at least partially enclose an area along, and approximate to one end of, the handle, the channel-like member conforming approximately to the size and shape of a leather test specimen, and a resilient member rigidly secured by one end to the handle and having means at the other end to clamp one end of a test specimen in the channel-like member. A means for supporting the device in position for use is also provided.

Figures 1, 2:
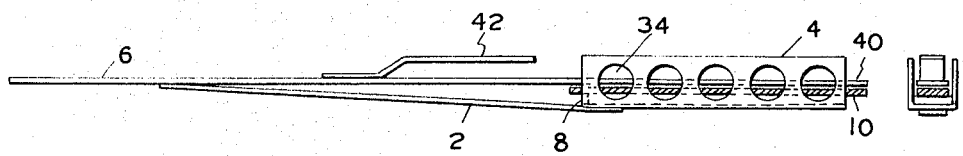
FIG. 2 is an end view of the specimen holder of FIG. 1.
Figure 3:
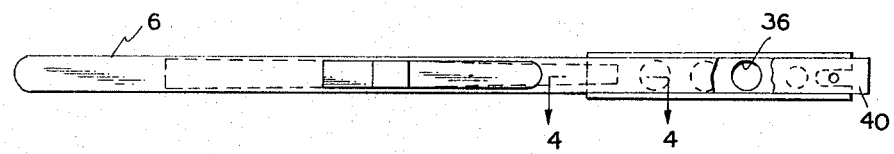
FIG. 3 is a top view of the specimen holder of FIG. 1 with the specimen omitted and part broken away.
Figure 4:
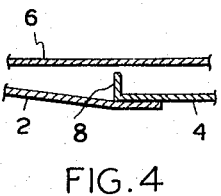
FIG. 4 is an enlarged section along line 4—4 of FIG. 3.

In particular, with reference to FIG. 1, the resilient member 2 serves as the means of securing channel-like member 4 to handle 6. The clamping finger 8 for fixing one end of test specimen 10, in the channel-like member, is achieved by adapting the channel-like member to engage the specimen securely in opposition to the elongated handle. The adaptation is provided by constructing the channel-like member with its bottom, at one end, extending beyond the plane of the sides, and then bending the extended portion in the direction of the sides to approximately a right angle from the bottom. By affixing the adapted end of the channel-like member to the resilient member, clamp 8 becomes integral with the resilient member 2. These features are depicted more clearly in the enlarged section, FIG. 4.

Figure 7:
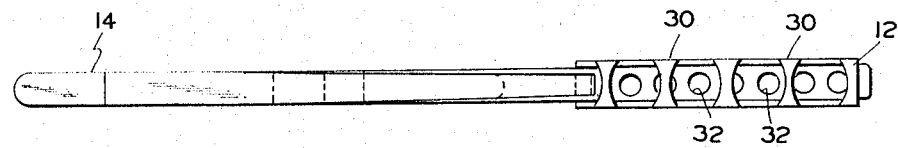
FIG. 7 is a top view of the specimen holder of FIG. 5.
Figures 5, 6:
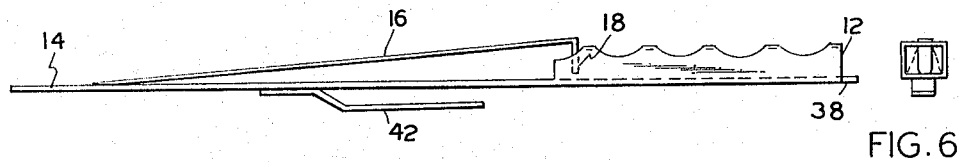
FIG. 5 is a side elevation of another embodiment of the specimen holder.
FIG. 6 is an end view of the specimen holder of FIG. 5.
Figure 10:
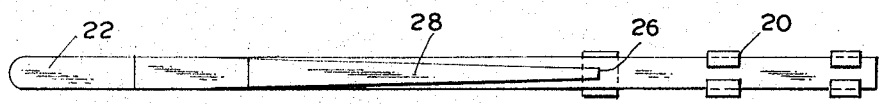
FIG. 10 is a top view of the specimen holder of FIG. 8.

In another embodiment of the present invention illustrated by FIGS. 5, 6 and 7, channel 12 is affixed to or integral with one end of handle 14, and the resilient member 16 is bent at the unattached end to provide clamp 18 which acts in opposition to handle 14 to hold the specimen.

Figures 8, 9:
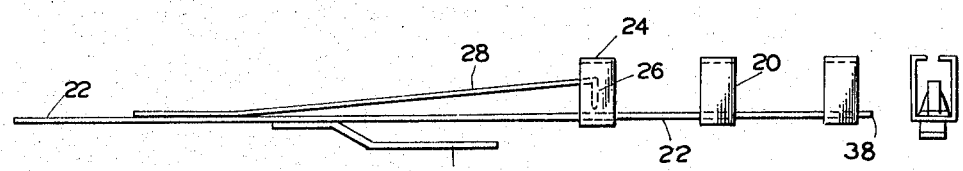
FIG. 8 is a side elevation of a third embodiment of the specimen holder of the present invention.
FIG. 9 is an end view of the specimen holder of FIG. 8.

The embodiment depicted in FIG. 8 has features in common with that of FIG. 5, but a major variation is that the channel for restricting movement of the specimen is discontinuous, consisting of a plurality of strips 20 secured to handle 22 and bent to form a generally rectangular opening as shown in FIG. 9. Strip 24 adjacent to clamp 26 is open at the top to permit free movement of resilient member 28.

The open structure of the embodiment shown in FIG. 8 permits water to flow around a specimen with a minimum of interference from the specimen-restricting elements. Circulation of water around a specimen in the holder of FIG. 5 is facilitated by providing a plurality of holes in the channel-like member 12. As shown in FIG. 7, relatively large sections of the top of channel 12 are cut away to leave ribs 30 and smaller holes 32 are provided in the bottom or trough area. The holder of FIG. 1 has a plurality of side-wall holes 34 in addition to trough holes 36 to assure ready access of circulating water to a specimen.

The holders shown in FIG. 5 and FIG. 8 are used in the same way. The principal reason for difference in design is to accommodate different leathers. This aspect will be better appreciated from the end views of the respective holders, FIG. 6 for light leather, FIG. 9 for heavy (thick) leather. In each instance, the specimen is introduced at the open end and is allowed to slide along inside the channel or cage-like structure until, with lifting of the resilient member, one end is past the plane of contact with the clamp (as 18 or 26) and the other end is flush with the handle extension 38. The resilient member is released and the clamp secures one end of the specimen which is now properly placed for the shrink-temperature determination.

The holder of FIG. 1 differs from the other embodiments in that it is a universal type and can be used to determine shrink temperatures of the leather specimens of a wide range of thickness. It adapts to specimen thickness with an optimum amount of specimen restriction. Since clamp 8 is integral with the trough of channel 4, the channel trough is, within limits of difference in the gripping of the specimen by clamp 8, fixed at a pre-selected distance from the specimen, regardless of the specimen thickness.

This holder has a further advantage in that its use minimizes the error in shrink temperature measurement due to deformation of specimen incurred in placing it in the holder. Flaccid specimens, as obtained with some light leathers or with specimens of untanned skins, are subject to linear deformation upon insertion into and during adjustments prior to measurement in other holders, particularly with the cage-type holder of FIG. 7. In using the holder of FIG. 1 the channel-like member is pulled gently away from handle 6, the leather specimen 10 is placed on the handle with one end of the specimen even with end 40 of handle 6. The channel-like or cage member 4 is lowered until clamp 8 engages the specimen and pins this end against handle 6. Essentially no manipulation of the specimen is required.

Figure 11:
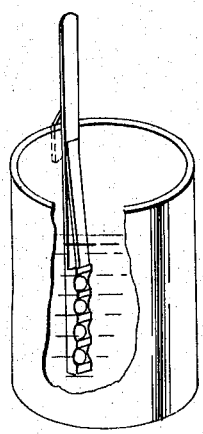
FIG. 11 is a perspective view illustrating the holder of FIG. 5 in typical upright position in a transparent container of water with part cut away.

Various means of supporting the holder in the water bath can be employed. The holder can be supported on the edge of the container, as depicted in FIG. 11, or held on support means extending above the container by clamps gripping the upper end of the handle or by hooks to engage holes in the upper end of the handle. The holders of the present invention were provided with a flat metal clip 42 of a uniform size and shape, and located in substantially identical relative positions on the respective handles. Brackets (not shown) were constructed for mounting across the open top of a glass beaker or other transparent container, the brackets having a plurality of slots, each adapted to receive a metal clip. This provides a means of steady support for the holder, and, with the holders supported in a row at approximately the same height, an experienced operator can simultaneously observe at least six specimens and make accurate shrink temperature determinations.

While the holders can be made in many sizes, the typical holder of the present invention was designed for use with small die-cut specimens about 2¼" long and ⅜₆" wide. The holders were constructed of stainless steel, the handles and clips of 0.035" stock, channel-like members of 0.019" stock, and the resilient members of 0.023" spring stock, the parts of the respective holders being affixed by spot welding. The handles 6, 14 and 22 were substantially the same, 7" long by ¼" wide. The channel-like members were 2" in length, about ⁵⁄₃₂" in width, and were constructed with varying inside depth clearance as desired, typically about ³⁄₁₆" for the channel of FIG. 5 and about ⁷⁄₁₆" for the strips of FIG. 8. The resilient members were positioned so that the clamps 8, 18 and 26 terminated exactly 2" from the handle ends 38 and 40.

In using the holders, wet specimens are inserted in the holders so that the free end is exactly even with the end of the handle (cf. FIG. 1). The holder and mounted specimen are dipped in water several times, and if necessary, the position of the specimen is readjusted. The holder is then supported by the clip so that the specimen is immersed in water, typically in distilled water at 50°±5° C. which is then heated at 3° to 3½° C. per minute. A thermometer is mounted near the holder and means is provided for stirring the water.

The utility of the holders and their practical advantage in obtaining meaningful Ts values has been thoroughly investigated. The following example is illustrative: Operator A used holders of the present invention to obtain a Ts value of 71°±1° C. for garment leather that was quite flaccid when wet. For the same leather, the Ts range was 72°±2° C. for 96% of the observations made on 45 similar specimens by nine observers; four experienced in using the holders; five "first-time" observers. The same leather, cut into proper size specimens as required by Method 7011 using the Theis meter with a 50-gram weight had an average Ts of 79°±1° C. when run by operator A.

The foregoing example shows that any one of a group of observers, experienced or inexperienced will, using these holders, obtain comparable Ts values. Moreover, the Ts obtained is considered to be a more practical, truer shrink temperature for the leather being evaluated than that obtained by using the Theis meter. While shrink temperatures are employed primarily as a means of evaluating and comparing tanning of leather, the consumer use of washable leather makes the practical shrink temperature have added significance.

We claim:
1. A holder for a leather specimen comprising an elongated handle, a channel-like member secured to said handle, said channel-like member adapted to at least partially enclose an area along, and approximate one end of, said handle, said channel-like member conforming approximately to the size and shape of a test specimen, a resilient member rigidly secured by one end to said handle and adapted at the other end to clamp one end of said specimen in the channel-like member, and means for supporting the holder.

2. The holder of claim 1 in which the channel-like member is secured to the resilient member.

3. The holder of claim 1 in which the channel-like member is integral with the elongated handle.

References Cited by the Examiner

UNITED STATES PATENTS

| | | | |
|---|---|---|---|
| 300,303 | 6/1884 | Butler | 24—164 |
| 788,252 | 4/1905 | Dalton | 24—259 |
| 1,146,645 | 7/1915 | Morehouse | 24—259 |
| 1,670,970 | 5/1928 | Laverdiere | 132—48 |
| 1,782,615 | 11/1930 | Hopwood | 269—254 |
| 2,110,542 | 3/1938 | Allen | 248—229 |
| 3,069,539 | 12/1962 | Kidd | 248—316 X |
| 3,202,484 | 8/1965 | Weaver et al. | 23—292 X |

CLAUDE A. LE ROY, *Primary Examiner.*

ROBERT P. SEITTER, *Assistant Examiner.*